US009266974B2

(12) United States Patent
Hottovy et al.

(10) Patent No.: US 9,266,974 B2
(45) Date of Patent: *Feb. 23, 2016

(54) PUMPING APPARATUS AND PROCESS FOR POLYMERIZATION IN LOOP REACTORS

(71) Applicants: Chevron Phillips Chemical Company LP, The Woodlands, TX (US); Flowserve Management Company, Irving, TX (US)

(72) Inventors: John D. Hottovy, Kingwood, TX (US); Dale A. Zellers, Bartlesville, OK (US); Robert K. Franklin, III, Houston, TX (US); Donald Paul Russell, Kingston, NH (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/712,752

(22) Filed: Dec. 12, 2012

(65) Prior Publication Data

US 2013/0102742 A1    Apr. 25, 2013

Related U.S. Application Data

(63) Continuation of application No. 12/771,383, filed on Apr. 30, 2010, now Pat. No. 8,354,063, which is a continuation of application No. 11/384,629, filed on Mar. 20, 2006, now Pat. No. 7,736,597, which is a
(Continued)

(51) Int. Cl.
*C08F 2/00* (2006.01)
*B01J 19/00* (2006.01)
(Continued)

(52) U.S. Cl.
CPC . *C08F 2/01* (2013.01); *B01J 8/005* (2013.01); *B01J 8/0015* (2013.01); *B01J 8/20* (2013.01);
(Continued)

(58) Field of Classification Search
USPC ............................... 526/64, 88; 422/224, 225
See application file for complete search history.

(56) References Cited

U.S. PATENT DOCUMENTS 1,502,865 A    7/1924  Moody
1,554,591 A    9/1925  Oliver
(Continued)

FOREIGN PATENT DOCUMENTS

EP    1195388    10/2002
EP    1444273    10/2006
(Continued)

OTHER PUBLICATIONS

Extended European Search Report, 10 177 374.5, mailed Dec. 22, 2010.

*Primary Examiner* — David W Wu
*Assistant Examiner* — Elizabeth Eng
(74) *Attorney, Agent, or Firm* — Fletcher Yoder, P.C.

(57) ABSTRACT

An olefin polymerization process and apparatus wherein a fluid slurry comprising monomer, diluent and catalyst is circulated in a continuous loop reactor by two or more pumps. The process and apparatus allow operating the reaction at significantly higher solids content in the circulating fluid slurry. In a preferred embodiment, the fluid slurry is circulated by two impellers arranged so that the downstream impeller benefits from the rotational energy imparted by the upstream impeller. An olefin polymerization process operating at higher reactor solids by virtue of more aggressive circulation has improved efficiencies, particularly in larger-volume reactors.

7 Claims, 7 Drawing Sheets

Related U.S. Application Data continuation of application No. 10/663,322, filed on Sep. 16, 2003, now Pat. No. 7,014,821.

(60) Provisional application No. 60/411,612, filed on Sep. 17, 2002.

(51) Int. Cl.

| | | |
|---|---|---|
| *B01J 19/18* | (2006.01) | |
| *C08F 2/01* | (2006.01) | |
| *B01J 8/00* | (2006.01) | |
| *B01J 8/20* | (2006.01) | |
| *B01J 8/22* | (2006.01) | |
| *B01J 8/38* | (2006.01) | |
| *C08F 6/00* | (2006.01) | |
| *C08F 10/00* | (2006.01) | |
| *C08F 10/02* | (2006.01) | |
| *C08F 10/06* | (2006.01) | |
| *C08F 110/06* | (2006.01) | |
| *C08F 210/16* | (2006.01) | |

(52) U.S. Cl.
CPC ........ *B01J 8/226* (2013.01); *B01J 8/382* (2013.01); *B01J 19/006* (2013.01); *B01J 19/0066* (2013.01); *B01J 19/1837* (2013.01); *B01J 19/1875* (2013.01); *C08F 6/003* (2013.01); *C08F 10/00* (2013.01); *B01J 2219/00094* (2013.01); *B01J 2219/00114* (2013.01); *B01J 2219/00189* (2013.01); *B01J 2219/00777* (2013.01); *C08F 10/02* (2013.01); *C08F 10/06* (2013.01); *C08F 110/06* (2013.01); *C08F 210/16* (2013.01)

(56) References Cited

U.S. PATENT DOCUMENTS

| | | | |
|---|---|---|---|
| 2,825,721 A | 3/1958 | Hogan et al. | |
| 3,242,150 A | 3/1966 | Scoggin | |
| 4,063,849 A | 12/1977 | Modianos | |
| 4,211,863 A | 7/1980 | McDaniel et al. | |
| 4,424,341 A | 1/1984 | Hanson et al. | |
| 4,452,956 A | 6/1984 | Moked et al. | |
| 4,674,290 A | 6/1987 | Verser | |
| 4,740,550 A | 4/1988 | Foster | |
| 5,183,866 A | 2/1993 | Hottovy | |
| 5,387,659 A | 2/1995 | Hottovy et al. | |
| 5,417,930 A | 5/1995 | McDonald, Jr. et al. | |
| 5,455,314 A | 10/1995 | Burns et al. | |
| 5,565,174 A | 10/1996 | Burns et al. | |
| 5,565,175 A | 10/1996 | Hottovy et al. | |
| 5,575,979 A | 11/1996 | Hanson | |
| 5,597,892 A | 1/1997 | Hanson | |
| 5,624,226 A | 4/1997 | Yamada et al. | |
| 6,042,790 A | 3/2000 | Hottovy et al. | |
| 6,045,661 A | 4/2000 | Kreischer et al. | |
| 6,051,631 A | 4/2000 | Hottovy | |
| 6,114,501 A | 9/2000 | Hottovy et al. | |
| 6,204,344 B1 | 3/2001 | Kendrick et al. | |
| 6,239,235 B1 | 5/2001 | Hottovy et al. | |
| 6,262,191 B1 | 7/2001 | Hottovy et al. | |
| 6,281,300 B1 | 8/2001 | Kendrick | |
| 6,319,997 B1 | 11/2001 | Kendrick et al. | |
| 7,014,821 B2 * | 3/2006 | Hottovy et al. | 422/135 |
| 7,736,597 B2 * | 6/2010 | Hottovy et al. | 422/132 |

FOREIGN PATENT DOCUMENTS

| | | |
|---|---|---|
| JP | 2002048083 | 2/2002 |
| WO | 9960028 | 11/1999 |
| WO | WO 9960028 A2 * | 11/1999 |
| WO | 0105842 | 1/2001 |

* cited by examiner

PUMPING APPARATUS AND PROCESS FOR POLYMERIZATION IN LOOP REACTORS

RELATED APPLICATIONS

This application is a continuation of U.S. application Ser. No. 12/771,383 filed on Apr. 30, 2010, now U.S. Pat. No. 8,354,063, which issued on Jan. 15, 2013, which is a continuation of U.S. patent application Ser. No. 11/384,629, filed on Mar. 20, 2006, now U.S. Pat. No. 7,736,597, which issued on Jun. 15, 2010, which is a continuation of U.S. patent application Ser. No. 10/663,322, filed on Sep. 16, 2003, now U.S. Pat. No. 7,014,821, which issued on Mar. 21, 2006, and which claims the benefit of U.S. Provisional 60/411,612, filed on Sep. 17, 2002, which are all herein incorporated by reference in their entirety.

FIELD OF THE INVENTION

This invention relates to slurry polymerization in a liquid medium. More particularly, the invention relates to improved pumping apparatus and processes for a large-volume loop reactor used for slurry polymerization.

BACKGROUND OF THE INVENTION

Polyolefins such as polyethylene and polypropylene may be prepared by particle form polymerization, also referred to as slurry polymerization. In this technique, feed materials such as monomer and catalyst are fed to a loop reactor, and a product slurry containing solid polyolefin particles in a liquid medium is taken off or withdrawn from the reactor.

In a loop polymerization operation, a fluid slurry is circulated around the loop reactor using one or more pumps, typically axial flow pumps having impellers disposed within the reactor. The pumps provide the motive force for circulation of the fluid slurry. As the volume of the reactor and the solids concentration of the fluid slurry increase, the demands on the pumps also increase. In general, the flow rate, pressure, density, and viscosity of the fluid slurry must be considered in selecting and operating the loop reactor pumps.

Slurry polymerization in a loop reaction zone has proven commercially successful. The slurry polymerization technique has enjoyed international success with billions of pounds of olefin polymers being so produced annually. However, it is still desirable to design and build larger reactors. The size of a reactor has a significant impact on the pump requirements, particularly as to the head (differential pressure across the impeller of the pump, expressed in feet of liquid) and flow (velocity multiplied by cross-sectional area of the pipe, expressed in gallons per minute or GPM) developed by the pump.

Until fairly recently, fluid slurries of olefin polymers in a diluent were generally limited to relatively low reactor solids concentrations. Settling legs were used to concentrate the slurry to be withdrawn, so that at the exit of the settling legs, the slurry would have a higher solids concentration. As the name implies, settling occurs in the setting legs to increase the solids concentration of the slurry to be withdrawn.

In addition to the concentration of the slurry, another factor affecting the solids concentration in the reactor is fluid slurry circulation velocity. A higher slurry velocity for a given reactor diameter allows for higher solids, since the slurry velocity affects such limiting factors as heat transfer and reactor fouling due to polymer build up in the reactor.

By increasing the head and flow capability of the loop reactor circulating pump(s), one can circulate a higher weight percent solids in the reactor. The use of two pumps in series may allow a doubling of pumping head capability and a resulting solids increase. The two pumps may be located on different segments of the reactor and it may be desirable for each pump to be dedicated to an even number of legs.

BRIEF SUMMARY OF THE INVENTION

A loop reactor apparatus can comprise a plurality of vertical segments, a plurality of upper horizontal segments, and a plurality of lower horizontal segments. Each of the vertical segments is connected at an upper end to one of the upper horizontal segments, and is connected at a lower end to one of the lower horizontal segments. The vertical and horizontal segments form a continuous flow path adapted to convey a fluid slurry. The loop reactor apparatus may include at least two pumps for imparting motive force to the fluid slurry within the reactor. Each pump is operably connected to an impeller disposed in the continuous flow path. Two impellers face each other and rotate in opposite directions and the two impellers are spaced sufficiently close so that one of the impellers benefits from the rotational energy of the other of the impellers. On the other hand, the loop reactor system may incorporate a single pump, such as a mixed flow pump. The loop reactor apparatus generally also includes means for introducing an olefin monomer into the continuous flow path; means for introducing a diluent into the continuous flow path; means for introducing a polymerization catalyst into the continuous flow path; and means for removing a portion of a fluid slurry from the continuous flow path.

A loop reactor apparatus can comprise a plurality of major segments and a plurality of minor segments. Each minor segment connects two of the major segments to each other, whereby the major and minor segments form a continuous flow path. The loop reactor apparatus also includes a monomer feed attached to one of the segments, a catalyst feed attached to one of the segments; and a product take-off attached to one of the segments. The loop reactor apparatus may also include an upstream pump and a downstream pump, wherein the pumps each are attached to an impeller disposed in the interior of the continuous flow path. The pumps are arranged so that the impellers rotate in opposite directions and are sufficiently close so that the rotational energy imparted by the upstream pump is at least partially recovered by the downstream pump. The impellers are situated in at least one enlarged section of one of the segments. The enlarged section and the impellers having diameters greater than diameter of the segments.

Either of these loop reactor apparatus may also include two impellers are disposed in the same horizontal segment. Furthermore, a portion of continuous flow path upstream of at least one of the impellers may house at least one guide vane arranged to impart rotational motion in a direction opposite to the rotational motion of the impeller.

A loop reactor apparatus can comprise a plurality of major segments and a plurality of minor segments. Each minor segment connects two of the major segments to each other, whereby the major and minor segments form a continuous flow path. The loop reactor apparatus also includes a monomer feed attached to one of the segments, a catalyst feed attached to one of the segments, and a product take-off attached to one of the segments. The loop reactor apparatus also includes at least one guide vane disposed within the continuous flow path and a pump downstream of the guide vane. The pump is attached to an impeller disposed in the interior of the flow path and the impeller is also downstream of the guide vane. The guide vane and the impeller impart rotational motion on the flow path in opposite directions and are sufficiently close so that the slurry is engaged in rotational motion upon engaging the downstream pump.

A loop reactor apparatus can comprise a pipe loop reactor adapted for conducting an olefin polymerization process comprising polymerizing at least one olefin monomer in a liquid diluent to produce a fluid slurry comprising liquid diluent and solid olefin polymer particles. The loop reactor apparatus can also comprise a monomer feed attached to the pipe loop reactor, a catalyst feed attached to the pipe loop reactor, a product take-off attached to the pipe loop reactor, and at least one mixed flow pump disposed within the pipe loop reactor.

Any of these loop reactor apparatus may have an impeller situated in an enlarged section of one of the lower horizontal or minor segments. The enlarged section and the impeller(s) have diameters greater than a diameter of the lower horizontal segments. Generally, each impeller will have a diameter greater than the average diameter of the segments.

A loop slurry polymerization process can include introducing monomer, diluent, and catalyst to a loop reactor, polymerizing the monomer to form a slurry comprising the diluent and solid polyolefin particles, circulating the slurry using two impellers, imparting a first rotational motion to the slurry with a first of the impellers, and imparting a second rotational motion to the slurry with a second of the impellers. In the improved process, the second rotational motion is opposite to the first rotational motion. The process may also include pre-swirling the slurry upstream of the first impeller, in a direction opposite to the first rotational motion of the impeller of the first impeller. The process may also include post-swirling the slurry downstream of the second pump to recover swirling motion of the second pump impeller and covert it into flow and head in the axial direction of the pump.

A loop slurry polymerization process can comprise introducing monomer, diluent, and catalyst to a loop reactor, polymerizing the monomer to form a slurry comprising the diluent and solid polyolefin particles, circulating the slurry using at least one impeller, imparting a first rotational motion to the slurry prior to the slurry reaching the impeller(s), and imparting a second rotational motion to the slurry with the impeller(s). In the improved process, the second rotational motion is in a direction opposite to the first rotational motion. The first rotational motion is desirably imparted by pre-swirl vanes.

In any of these loop slurry polymerization processes, one may minimize the clearance between at least one impeller and a portion of the loop reactor housing the impeller. In the improved processes, the slurry may have has a desired minimum concentration of the solid polyolefin particles, for example at least about 45 weight percent. The slurry may be circulated at a flow of from about 20,000 gallons per minute to about 100,000 gallons per minute. The impeller(s) alone or together may achieve a head of from about 120 feet to about 600 feet.

DETAILED DESCRIPTION OF THE INVENTION

Figure 1:
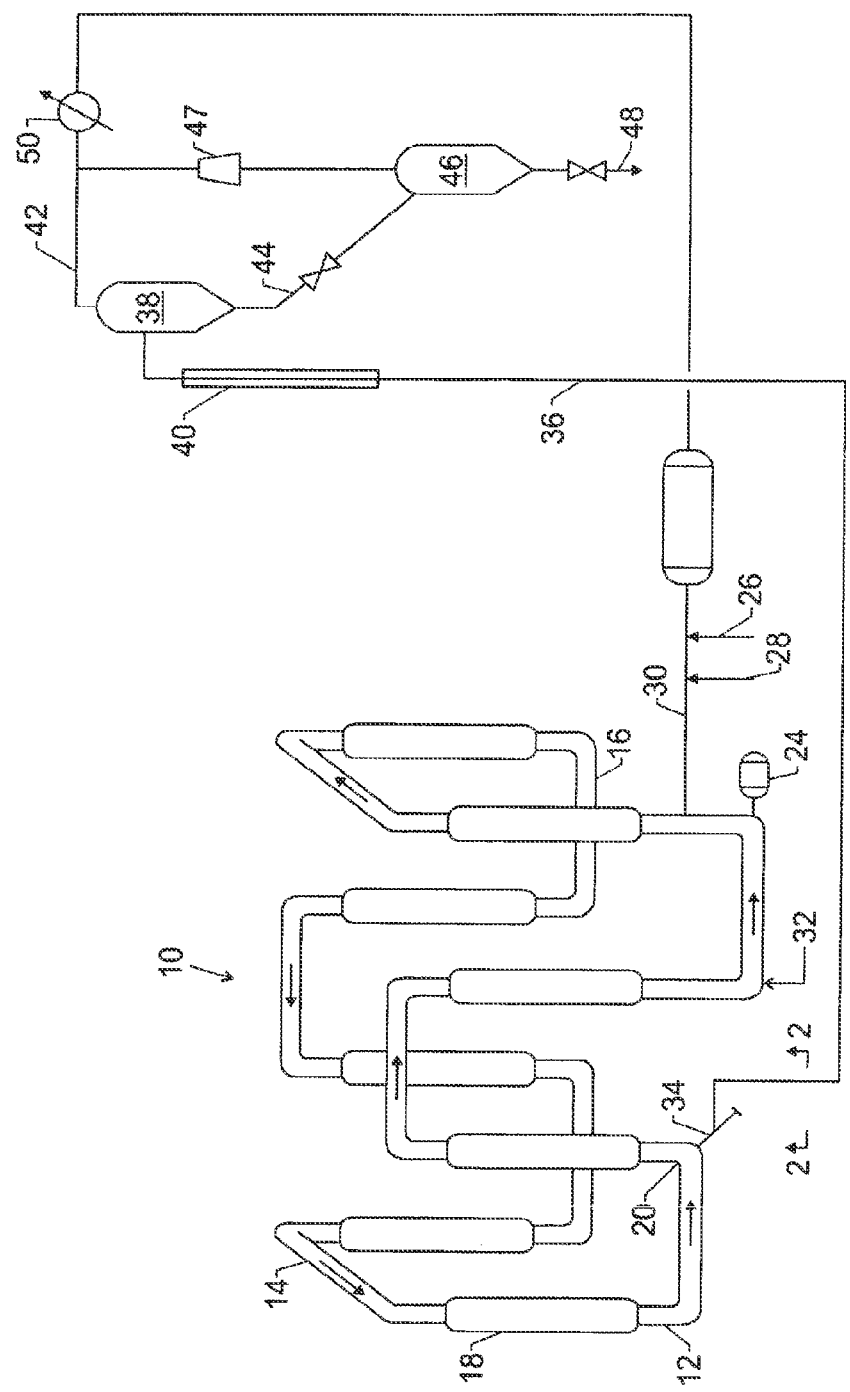
FIG. 1 shows a prior art loop reactor and polymer recovery system.

The present process and apparatus are applicable to any loop reaction zone, which comprises a slurry of polymer solids in a liquid medium, including slurries employed in olefin polymerization processes. In particular, the present process and apparatus are applied to large-volume loop reactors in which a fluid slurry having a high solids concentration is circulated.

As used herein, the term "slurry" means a composition in which solids and liquid are present in separate phases. The term "fluid slurry" means the slurry comprising polymer solids and liquid medium circulating in a loop reaction zone. The solids may include catalyst and a polymerized olefin, such as polyethylene. The liquid medium may include an inert diluent, such as isobutane, with dissolved monomer, comonomer, molecular weight control agents, such as hydrogen, antistatic agents, antifouling agents, scavengers, and other process additives. Alternatively, the liquid medium may be made up primarily of the unreacted monomer, such as in some propylene polymerization processes. The term "product slurry" means the portion of slurry withdrawn from the loop reaction zone for recovery of the polyolefin product.

It is not easy to design and build a single pump that is able to provide the necessary head and flow capability for a large-volume loop reactor for slurry polymerization, particularly if the slurry will have a high solids concentration. Greater head and flow capability are desirable because they allow operation of the reactor at a higher solids concentration. A higher solids concentration has several advantages. For instance, a higher solids concentration in the reactor generally means less diluent will be removed as part of the product slurry. Also, a higher solids concentration can increase the yield of polymer over a period of time (or increase the residence time of the polymer at the same production rate there by increasing the catalyst efficiency). While the present discussion at times may focus on the use of two or more pumps or impellers, it should emphasized that the present techniques provide for employment of a single pump, such as a mixed-flow pump.

In U.S. Pat. No. 6,239,235, which is incorporated by reference herein, some of the present inventors disclosed a process and apparatus in which a high solids pump and a continuous take-off appendage enabled significant increases in solids concentrations within the reactor. Concentrations of greater than 40 weight percent are possible in accordance with this process and apparatus. (Throughout this application, the weight of catalyst is disregarded since the productivity, particularly with chromium oxide on silica, is extremely high.)

The present process and apparatus are suitable for circulating a fluid slurry having a minimum solids concentration of at least 40 weight percent, alternatively at least 45 weight percent, alternatively at least 46 weight percent, alternatively at least 47 weight percent, alternatively at least 48 weight percent, alternatively at least 49 weight percent, alternatively at least 50 weight percent, alternatively at least 51 weight percent, alternatively at least 52 weight percent, alternatively at least 53 weight percent, alternatively at least 54 weight percent, alternatively at least 55 weight percent, alternatively at least 56 weight percent, alternatively at least 57 weight percent, alternatively at least 58 weight percent, alternatively at least 59 weight percent, alternatively at least 60 weight percent. The process and apparatus are also suitable for circulating a fluid slurry having a maximum solids concentration of at most 75 weight percent, alternatively at most 74 weight percent, at most 73 weight percent, at most 72 weight percent, at most 71 weight percent, at most 70 weight percent, at most 69 weight percent, at most 68 weight percent, at most 67 weight percent, at most 66 weight percent, at most 65 weight percent, at most 64 weight percent, at most 63 weight percent, at most 62 weight percent, at most 61 weight percent. The foregoing minimums and maximums may be absolute minimums or maximums or may be the minimums or maximums of the average solids concentration. Any minimum and any maximum amount of solids concentration, as specified above, may be combined to define a range of solids concentrations, providing that the minimum selected is less than the maximum selected. In some situations, the foregoing weight percents may be approximate.

The present processes and apparatus are suitable for the homopolymerization of ethylene and the copolymerization of ethylene and a higher 1-olefin such as butene, 1-pentene, 1-hexene, 1-octene or 1-decene. A preferred process is the copolymerization of ethylene and, as a starting material, an amount of comonomer in the range of 0.01 to 10 weight percent, preferably 0.01 to 5 weight percent, more preferably 0.1 to 4 weight percent, wherein the comonomer is selected from the foregoing higher 1-olefins, and the weight percent is based on the total weight of ethylene and comonomer. Alternatively, sufficient comonomer can be used as a starting material to give a resulting product polyolefin having an incorporated amount of comonomer in the range of 0.01 to 10, preferably 0.01 to 5, more preferably 0.1 to 4 weight percent. Such copolymers are still considered polyethylene.

Suitable diluents for use as the liquid medium in the present processes are well known in the art and include hydrocarbons that are inert and liquid under slurry polymerization conditions. Suitable hydrocarbons include isobutane, propane, n-pentane, i-pentane, neopentane and n-hexane, with isobutane being especially preferred.

Additionally, the present invention may be employed where the unreacted monomer is the liquid medium for the polymerization. For example, the present techniques may be used for the polymerization of propylene where propylene is the liquid medium and an inert diluent is not present in any substantial amount. A diluent may still be used for the catalyst. For illustration, but not as a limitation, the present invention will be described in connection with a polyethylene process using an inert diluent as the liquid medium, but it is to be understood that the present invention may also be employed where the monomer is used as the liquid medium and would take the place of the diluent in the following descriptions.

Suitable catalysts are also well known in the art. Particularly suitable is chromium oxide on a support such as silica as broadly disclosed, for instance, in U.S. Pat. No. 2,825,721, which is hereby incorporated by reference. Reference herein to silica supports is meant to also encompass any known silica containing support such as, for instance, silica-alumina, silica-titania and silica-alumina-titania. Any other known support such as aluminum phosphate can also be used. The invention is also applicable to polymerizations using organometal catalysts including those frequently referred to in the art as Ziegler catalysts and metallocene catalysts.

Additional details regarding loop reactor apparatus and polymerization processes may be found, for example, in U.S. Pat. Nos. 4,674,290; 5,183,866; 5,455,314; 5,565,174; 6,045,661; 6,051,631; 6,114,501; and 6,262,191, which are incorporated herein by reference.

Pumps are used for slurry polymerization in a loop reactor to provide the motive force for circulation of the fluid slurry containing solid polymer particles in a diluent. Pumps having impellers disposed in the reactor or in the reaction zone may be employed. Such axial flow pumps can circulate the fluid slurry at a velocity. As the slurry velocity increases, the transfer of heat from the reactor to cooling jackets (or other cooling systems) improves, and a higher level of solids can be circulated. Increased slurry velocity, however, requires more power supplied by the pump motor, higher head, and more shaft, bearing, seal and impeller strength. It is therefore desirable to emphasize pump efficiency, construction details and pump specification details. A number of techniques are available to emphasize these points and facilitate pumping a large volume of polymerization slurry having a high solids concentration at a high velocity.

Figure 3:
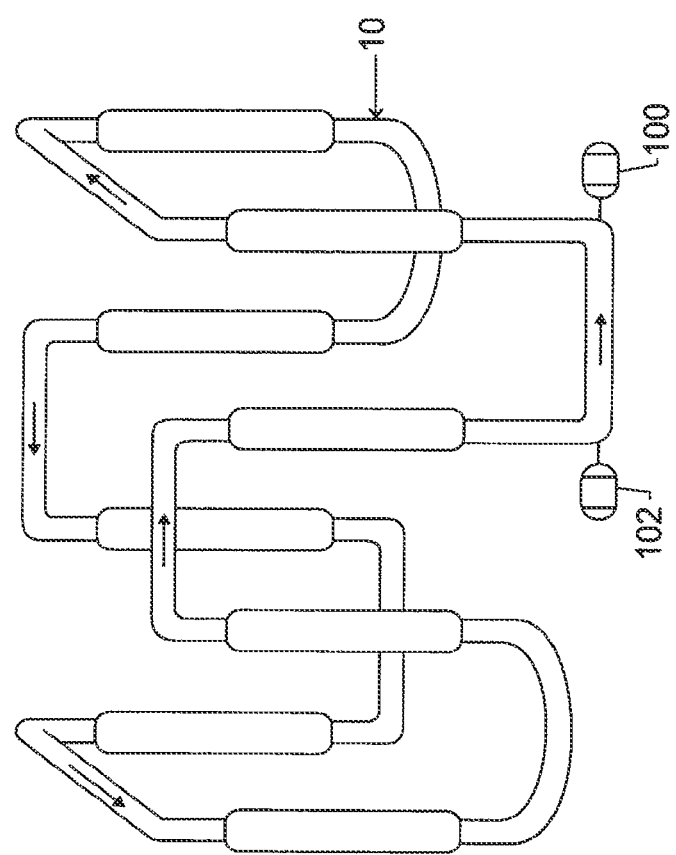
FIG. 3 shows a loop reactor having two pumps arranged to make improved use of rotational energy.
Figure 4:
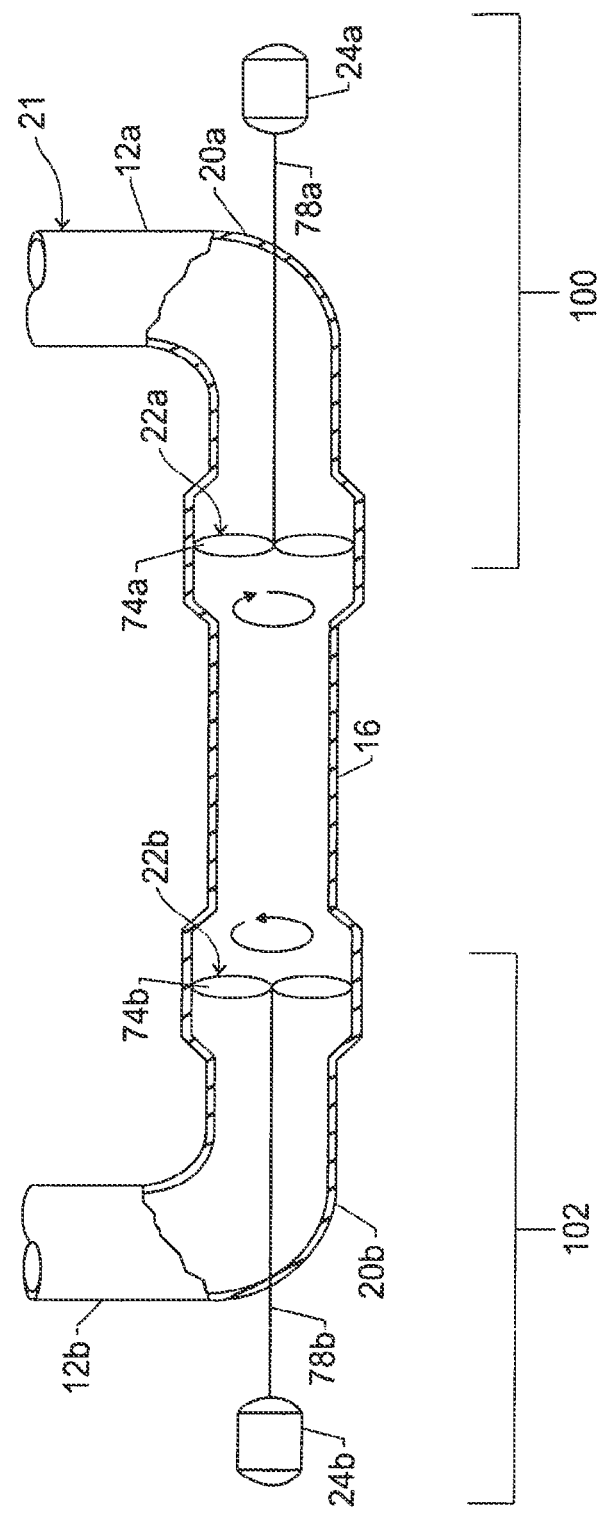
FIG. 4 is a closer view of the two-pump arrangement of FIG. 3.

First, one may employ a dual pump arrangement in which the pumps are arranged so that the rotational energy imparted by the upstream pump is at least partially recovered by the downstream pump. For example, two pumps can be arranged on a single horizontal segment or a single minor segment. Two pumps may be placed at adjacent loop reactor elbows so that the rotational energy imparted on the slurry by the first pump (the upstream pump) is partially recovered in the second pump (the downstream pump) that is turning its impeller in an opposite direction. This arrangement improves the head and flow of the slurry and thus the pumping efficiency for two pumps in series. FIGS. 3 and 4 demonstrate this technique. In other situations, the impellers need not be disposed in the same segment, so long as they are sufficiently close so that the downstream impeller benefits from the rotational energy of the upstream impeller. In still other situations, substantial benefits may be found by positioning the pumps and/or impellers in an asymmetrical arrangement.

Figure 5:
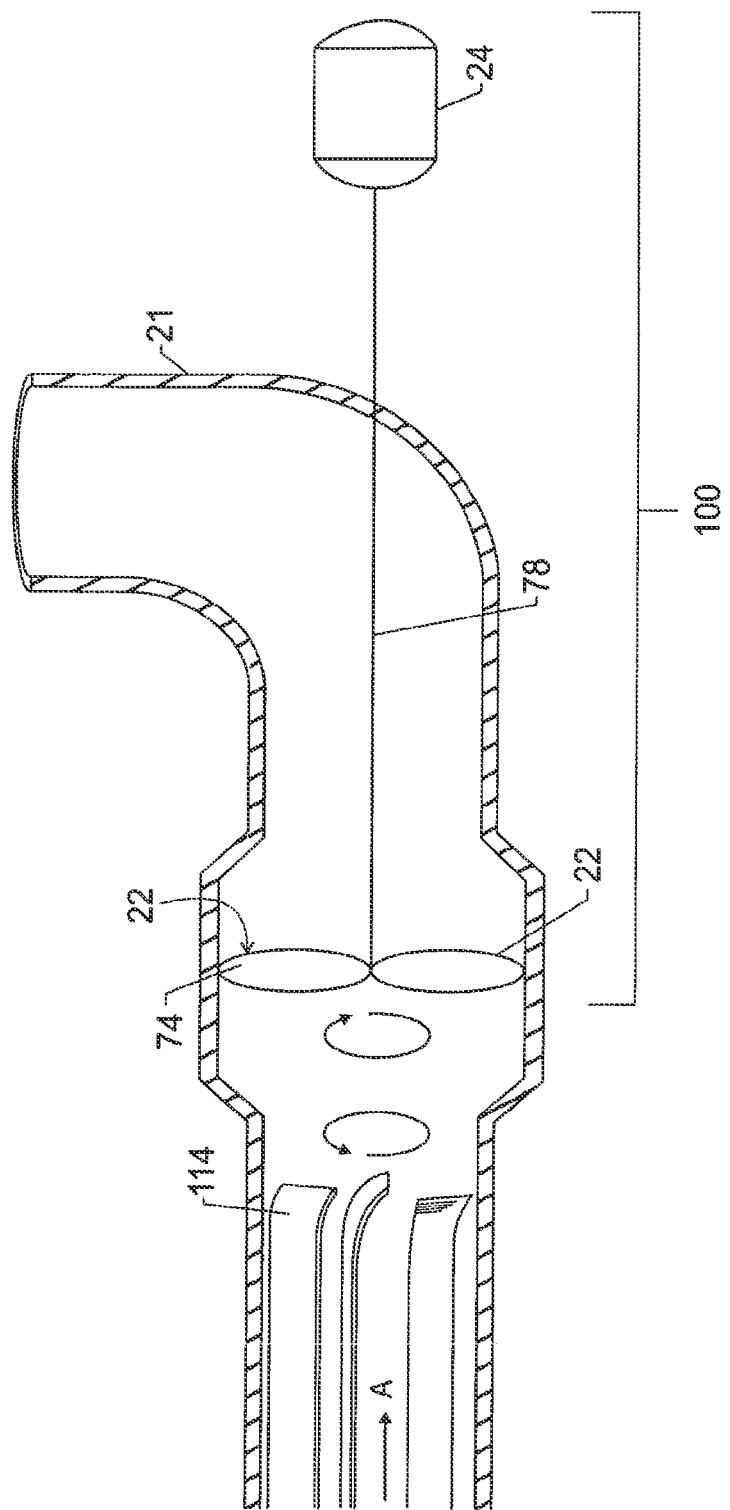
FIG. 5 shows the loop reactor with guide vanes.

Second, one may employ guide vanes (also referred to herein as pre-swirl vanes or post-swirl vanes) or another means for passively rotating the slurry, to impart rotation into the slurry. The pre-swirl vanes may impart a rotation into the slurry before it arrives at the impeller. The guide vanes may impart a rotation in the opposite direction of the rotation imparted by the impeller, so that the pump has an increased relative rotational velocity and the slurry has a greater discharge velocity and flow. This produces improved pump efficiency. Post-swirl vanes may impart a rotation to the slurry after it passes the impeller. The rotation imparted from the post-swirl vanes may be the same as or the opposite of the rotation imparted by the impeller, depending on the desired effect. Post-swirl vanes can be incorporated into the design of the struts that support a bearing or seal housing for the pump shaft. Also if there are two or more impellers on one shaft rotating in the same direction, a guide vane can be placed between the impellers to redirect rotational motion into axial motion or counter rotation to improve the efficiency, pump capacity and pump differential head. FIG. 5 illustrates the placement of pre-swirl vanes or guide vanes in relation to the pump impeller for the practice of this technique. Such pre-swirl vanes can increase pump efficiency by at least 2%, alternatively at least 3%, alternatively at least 4% alternatively at least 5%, alternatively at least 6%, alternatively at least 7%, alternatively at least 8%, alternatively at least 9%, alternatively at least 10%. In some situations, the foregoing values are approximate.

Third, one may minimize the clearance between a pump impeller and a reactor pipe housing the impeller. The impeller and the reactor wall in which the impeller is disposed (located) define a clearance. Minimizing this clearance reduces back circulation from the discharge of the pump (high pressure) to the pump suction (low pressure). This improves pump flow and head. However, a balance must be struck with an increased tendency to break solids into smaller particles or fines. The clearance may be $1/72$ inch or less, $1/64$ inch or less, $1/48$ inch or less, $1/32$ inch or less, $1/24$ inch or less, $1/16$ inch or less, or ⅛ inch or less. The foregoing clearance values may be approximate in some situations.

Fourth, one can manufacture the reactor pump impeller out of aluminum, titanium or steel using the manufacturing technique of machining on a 6-axis computer controlled milling machine. This allows fabrication out of solid masses of metal that can be screened for voids in advance. This prevents weak impeller segments due to voids, and the thickness of an impeller section can be closely controlled to impart the necessary strength to withstand high head and flow requirements of operating a loop reactor at a higher solids concentration.

Figure 2:
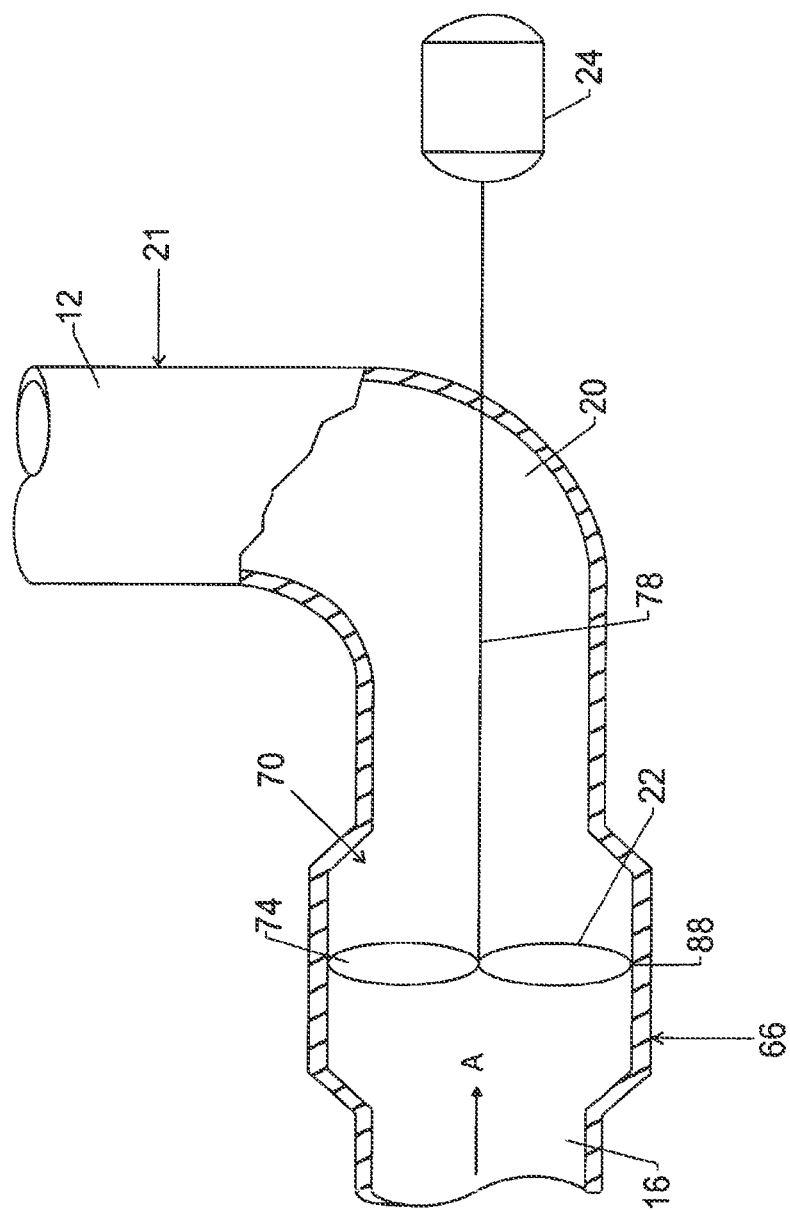
FIG. 2 is a cross-sectional view of the impeller mechanism.

Fifth, one may employ a pump impeller having a diameter greater than the loop reactor's diameter (as shown in FIG. 2 herein and in FIG. 8 of U.S. Pat. No. 6,239,235). For example, for a 24-inch diameter polyethylene loop reactor, one may use an impeller having a diameter of 26 inches or more. Alternatively, one may use an impeller having a diameter of 28 inches or more. Alternatively, one may use an impeller having a diameter of 30 inches or more. One also may use a polyethylene loop reactor circulating pump with a speed (RPM) of 180 to 18,000 to achieve a reactor circulating pump with a pump head of 120 to 600 feet of head and 20,000 to 100,000 GPM with a 24 inch (nominal) diameter polyethylene loop reactor. Other ranges are appropriate for loop reactors of other sizes.

Sixth, one may employ a radial or mixed flow pump. In a radial or mixed flow pump, the impeller blades impart a greater amount of speed and energy into the flow of slurry upon contacting the slurry than conventional axial pumps. Thus, radial or mixed pumps generate greater flow head and velocity to better address the pressure needs of larger reactors. This changes the character of the axial flow pump to one more like the radial or typical centrifical pump where the fluid flow leaves the impeller in radial direction after entering the pump in an axial direction. In a mixed flow pump, the fluid flow leaves the impeller with a vector that has both axial and radial components. This vector can have an angle from 0 degrees to 90 degrees, where 0 degrees indicates a vector leaves the pump in the axial direction and 90 degrees indicates a vector leaves the pump in the radial direction.

Any or all of the foregoing techniques may be used in conjunction with a polymerization process that employs continuous take-off, settling legs, flashline heater(s), a flash system for separating diluent from polymer by vaporization, and direct recycle of diluent to the reactor in a new or retrofitted loop process for producing polyolefin. The present apparatus and process may employ continuous take-off to obtain a further increase the reactor solids concentration, as described in U.S. Pat. No. 6,239,235, which is incorporated by reference herein. Alternatively or additionally, the present apparatus and process may employ settling legs to increase the settling efficiency. The term "settling efficiency" is defined as the lb/hr of polymer withdrawn from a settling leg (or continuous take-off) divided by the total of lb/hr of polymer plus lb/hr of isobutane diluent withdrawn over the same time from that settling leg (or continuous take-off).

Referring now to the drawings, FIG. 1 shows a typical loop reactor 10 having vertical segments 12, upper horizontal segments 14 and lower horizontal segments 16. These upper and lower horizontal segments 14 and 16 define upper and lower zones of horizontal flow. An impeller is located in the loop reactor 14 to circulate the slurry. Each vertical segment 12 is connected to another vertical segment through a corresponding horizontal segment 14. The vertical segment 12 may include heat exchange jackets (or cooling jackets) 18. The vertical segments 12 and horizontal segments 14 define a loop reaction zone. The loop reaction zone may include more or fewer vertical segments 12 and corresponding horizontal segments 14 as that shown in FIG. 1. Further, the loop reaction zone may be oriented vertically or horizontally. Additionally, some or all of the horizontal segments 14 may be curved members that connect vertical segments. In fact, the connecting segments 14 may be any shape or form that connects the vertical segments 12 and allows fluid to flow there between.

The reactor is cooled by means of heat exchangers formed by vertical segments 12 and cooling jackets 18. As mentioned above, the greater the velocity of the slurry through the pipes 12, the better the transfer of heat from the loop reactor 10 to the cooling jackets 18 and thus a higher concentration of solids in the fluid slurry. Each segment is connected to the next segment by a smooth bend or elbow 20 thus providing a continuous flow path substantially free from internal obstructions. The slurry is circulated by means of impeller 22 (shown in FIG. 2) driven by motor 24. Monomer, and make up diluent are introduced via lines 26 and 28, respectively, which can enter the loop reactor 10 directly at one or a plurality of locations or can combine with condensed diluent recycle line 30 as shown. Comonomer may also be introduced to the reactor by these lines. The monomer and comonomer may be fed to the loop reactor 10 by any suitable techniques, such as a simple opening to the reactor, a nozzle, a sparger, or other distribution apparatus.

Catalyst is introduced via catalyst introduction means 32 that provides a zone (location) for catalyst introduction. Any suitable means of introducing catalyst to the loop reactor may be employed. For example, the process and apparatus disclosed in U.S. Pat. No. 6,262,191 hereby (incorporated by reference herein) for preparing a catalyst mud and providing it a loop reaction (polymerization) zone may be used with the present process and apparatus.

The elongated hollow appendage for continuously taking off an intermediate product slurry is designated broadly by reference character 34. Continuous take off mechanism 34 is located in or adjacent to a downstream end of one of the lower horizontal segments 16 and adjacent or on a connecting elbow 20. The loop reactor can have one or more continuous take off appendages.

In the apparatus shown in FIG. 1, the product slurry is passed via conduit 36 into a high pressure flash chamber 38. Conduit 36 includes a surrounding conduit 40, which is provided with a heated fluid, which provides indirect heating to the slurry material in flash line conduit 36. Vaporized diluent exits the flash chamber 38 via conduit 42 for further processing which includes condensation by simple heat exchange using recycle condenser 50, and returns to the system, without the necessity for compression, via recycle diluent line 30. Recycle condenser 50 can utilize any suitable heat exchange fluid known in the art under any conditions known in the art. However, a fluid at a temperature that can be economically provided (such as steam) is usually employed. A suitable temperature range for this heat exchange fluid is 40 degrees F. to 130 degrees F.

Polymer particles are withdrawn from high pressure flash chamber 38 via line 44 for further processing techniques known in the art. They can be passed to low pressure flash chamber 46 and thereafter recovered as polymer product via line 48. A fluff chamber (not shown) may be disposed between the high pressure flash chamber 38 and the low pressure flash chamber 46 to facilitate maintaining the pressure differential between the flash chambers. Separated diluent passes through compressor 47 to conduit 42. This two-stage flash design is broadly disclosed in Hanson et al. U.S. Pat. No. 4,424,341, the disclosure of which is incorporated by reference herein.

Any number of vertical segments 12 or "legs" can be employed in addition to the eight depicted in FIG. 1. It is contemplated that a twelve-leg reactor may benefit from the techniques disclosed herein. The flow length of the loop reaction zone is generally greater than 900 feet, alternatively greater than 1000 feet, alternatively greater than 1100 feet, alternatively greater than 1200 feet, alternatively greater than 1300 feet, alternatively greater than 1400 feet, alternatively greater than 1500 feet, alternatively greater than 1600 feet, alternatively greater than 1700 feet, alternatively greater than 1800 feet, alternatively greater than 1900 feet, alternatively greater than 2000 feet. The foregoing lengths may be approximate in some situations.

The present process and apparatus are particularly useful for reactors of 30,000 gallons or more, alternatively about 33,000 gallons or more, alternatively 35,000 gallons or more, alternatively 36,000 gallons or more, alternatively 40,000 gallons or more, alternatively 42,000 gallons or more, alternatively 44,000 gallons or more, alternatively 46,000 gallons or more, alternatively 48,000 gallons or more, alternatively 50,000 gallons or more, alternatively 60,000 gallons or more, alternatively 70,000 gallons or more, alternatively 80,000 gallons or more, alternatively 90,000 gallons or more, alternatively 100,000 gallons or more, because they efficiently utilize pumping equipment to generate superior performance. The foregoing volumes may be approximate. The present techniques may make it desirable to connect two loop reactors that were previously separate. Indeed, for relatively little capital cost, two 18,000 gallon reactors can be combined to form a 36,000 gallon reactor using the same two pumps, but with more than twice the productivity.

The loop reactor 10 may be operated so as to generate a pressure differential of at least 18 psi, alternatively at least 20 psi, alternatively at least 22 psi, alternatively at least 24 psi, alternatively at least 26 psi, alternatively at least 28 psig, alternatively at least 30 psi, between the upstream and downstream ends of one or more pumps in a nominal 24-inch diameter reactor. Generally the loop reactor 10 is operated so as to generate a head, expressed as a loss of pressure per unit length of reactor, of at least 0.07, foot slurry height pressure drop per foot of reactor length for a nominal 24-inch diameter reactor. Reference to a nominal two-foot (or 24-inch) diameter means an internal diameter of about 21.9 inches. For larger diameters, a higher slurry velocity and a higher pressure drop per unit length of reactor is needed. This assumes the specific gravity of the slurry generally is about 0.5-0.6.

Higher pressure differential or head can be achieved by using one or more of the techniques disclosed herein. For example, differential pressure can be improved by controlling the speed of rotation of the pump impeller, reducing the clearance between the blades of the impeller and the inside wall of the pipe, or by using a more aggressive impeller design. Differential pressure or head can also be increased by the use of at least one additional pump.

FIG. 2 shows impeller 22 for continuously moving the slurry along a flow path. Impeller 22 has blades 74 and is mounted on shaft 78 connected to motor 24. Pipe 21 has a vertical segment 12 and a lower horizontal segment 16 that interconnect at an elbow 20. Motor 24 turns shaft 78, and thus the blades 74, such that impeller 22 pushes the slurry in the direction of arrow A into elbow 20 and up vertical segment 12. As can be seen, impeller 22 is located in an enlarged section 66 of pipe 21 that serves as the propulsion zone 70. The enlarged section 66 of the pipe 21 has a greater diameter than the rest of pipe 21. By way of example only, the diameter of pipe 21 is 24 inches. By way of example only, the diameter of enlarged section 66 is greater than 24 inches. Therefore, impeller 22 has a diameter measured across the blades 74 that is larger than the diameter of pipe 21. By way of example only, the diameter of impeller 22 measured across the blades 74 is greater than 24 inches. Because the enlarged section 66 allows for the use of a larger impeller in the pipe 21, impeller 22 pushes the slurry at a greater velocity through pipe 21. The larger impeller 22 also increases head by increasing the pressure on the slurry at discharge. By way of example only, for a 24-inch reactor, the larger impeller 22 generates 20,000 to 100,000 gallons per minute of slurry and 120 to 600 feet of head. Thus, the larger impeller 22 also creates more heat transfer at the cooling jackets 18 (FIG. 1) such that loop reactor 10 (FIG. 1) produces greater levels of solids.

Alternatively, instead of increasing the diameter of impeller 22, a smaller impeller 22 may be operated at a speed of 180 to 18,000 RPM to achieve a head of 120 to 240 feet and a flow of 20,000 to 50,000 GPM with a 24-inch (nominal) diameter loop reactor.

FIG. 3 shows two pumps 100 and 102 positioned at opposite ends of a lower horizontal segment 16 of pipe 21. For clarity, other apparatus shown in FIG. 1 is omitted but would be used in a functioning polymerization system. As shown, pumps 100 and 102 direct the slurry flow in the direction of arrow A through loop reactor 10.

FIG. 4 shows the two pumps 100 and 102 and pipe 21 in greater detail. Pump 100 includes impeller 22a, which has blades 74a and is mounted on shaft 78a connected to the motor 24a. Pump 102 includes an impeller 22b, which has blades 74b and is mounted on a shaft 78b connected to a motor 24b. Pipe 21 has two parallel vertical segment 12a and 12b and a lower horizontal segment 16 that interconnects the vertical segments 12a and 12b at elbows 20a and 20b, respectively. Motor 24a turns shaft 78a, and thus the blades 74a of impeller 22a, in a first rotational direction, and motor 24b turns shaft 78b, and thus the blades 74b of the impeller 22b, in a second opposite rotational direction. By way of example only, impeller 22a rotates in a clockwise direction and the impeller 24b rotates in a counter-clockwise direction. The slurry flows through pipe 21 in the direction of arrow A first through pump 102 and then through pump 100.

The slurry flows head-on into impeller 22b generally parallel to shaft 78b. As the slurry flows past the blades 74b of impeller 22b, the blades 74b discharge the slurry tangentially at angles to shaft 78b and toward the inner wall of pipe 21. The slurry is discharged in a particular direction at a particular angle depending on the rotational direction of impeller 22b. Impeller 22a is positioned close enough to impeller 22b such that the slurry is still flowing at such tangential angles when the slurry approaches impeller 22a. The slurry engages the blades 74a of impeller 22a and, because impeller 22a rotates in the direction opposite the rotation of impeller 22b, is deflected by the blades 74a such that the slurry is discharged from impeller 22b traveling in the direction of arrow A at an orientation essentially parallel to shaft 78a. Thus, impeller 22a "straightens out" the directional path of the slurry and discharges the slurry at an axial alignment essentially parallel to shaft 78a. The slurry then flows to elbow 20a and up vertical segment 12a. Additionally, because the slurry engages the blades 74a at an angle, the slurry slides past the angled blades 74a with reduced resistance.

Because the slurry is flowing at an axial alignment generally parallel to shaft 78a upon being discharged by impeller 22a, the slurry travels at a greater velocity after passing through pump 100 than if the slurry flowed through only pump 102. The slurry discharged from pump 102 travels at a slower velocity because the slurry flows at angles toward the inner wall of pipe 21 and is thus deflected and slowed down by the inner wall. Additionally, because the slurry slides past the blades 74a with less resistance, less power is required by impeller 22 to engage the slurry. Therefore, by closely positioning two oppositely rotating pumps 100 and 102 in a series, the rotational energy imparted on the slurry by pump 102 is partially recovered in pump 100 such that the slurry flows through pipe 21 more efficiently and exits pump 100 at a greater velocity. Thus, the two pumps 100 and 102 produce improved levels of solids.

A two-stage pump could be used as a substitute for the two separate pumps 100 and 102. The two-stage pump includes two impellers in the same pump aligned next to each other and rotating in opposite directions.

FIG. 5 shows pump 100 and guide vanes 114 in pipe 21. The guide vanes 114 are situated upstream from pump 100 as the slurry flows through pipe 21 in the direction of arrow A. As such, these guide vanes are pre-swirl vanes. The guide vanes 114 extend from the inner wall of pipe 21 toward pump 100. The guide vanes 114 all curve radially inward at the same angle from the inner wall. The slurry approaches the guide vanes 114 in the direction of arrow A in a straight orientation generally parallel to shaft 78. As the slurry engages the guide vanes 114, the guide vanes 114 impart an angular rotation or swirl into the slurry such that the slurry flows toward the inner wall of pipe 21 at an angle to shaft 78. Depending on which direction the guide vanes 114 curve from the inner wall of pipe 21, the guide vanes 114 cause the slurry to rotate in a clockwise or counter-clockwise direction. By way of example only, the guide vanes 114 are oriented to create a counter-clockwise rotation of slurry.

The slurry departs guide vanes 114 and flows into contact with impeller 22 at an angle to shaft 78. Preferably, impeller 22 rotates in the opposite direction of the rotation of the slurry created by guide vanes 114. The impeller may rotate in the same direction as the slurry rotation created by the guide vanes. By way of example only, impeller 22 rotates in a clockwise direction. Because the slurry engages the blades 74 at an angle and is rotating in a direction opposite the blades 74, the slurry slides past the angled blades 74 with reduced resistance than if the slurry flowed to the blades 74 directly head-on. Thus, the velocity of the slurry flowing past impeller 22 is impeded less by the blades 74, and the rotational velocity of impeller 22 is impeded less by the slurry. Therefore, less power is needed to increase the velocity of the slurry as it departs from impeller 22, and impeller 22 requires less power from motor 24 to engage and push the slurry.

Additionally, when impeller 22 rotates in the direction opposite the rotation of the slurry after passing the guide vanes 114, the blades 74 deflect the slurry such that the slurry is discharged from impeller 22 traveling in the direction of arrow A at an orientation essentially parallel to shaft 78. Thus, impeller 22 "straightens out" the directional path of the slurry and discharges the slurry at an axial alignment essential parallel to shaft 78. The slurry flows faster when it is discharged parallel to shaft 78 than when it is discharged at an angle to shaft 78 toward the inner wall of pipe 21 because the inner wall resists and deflects the flow of the slurry.

Figure 6:
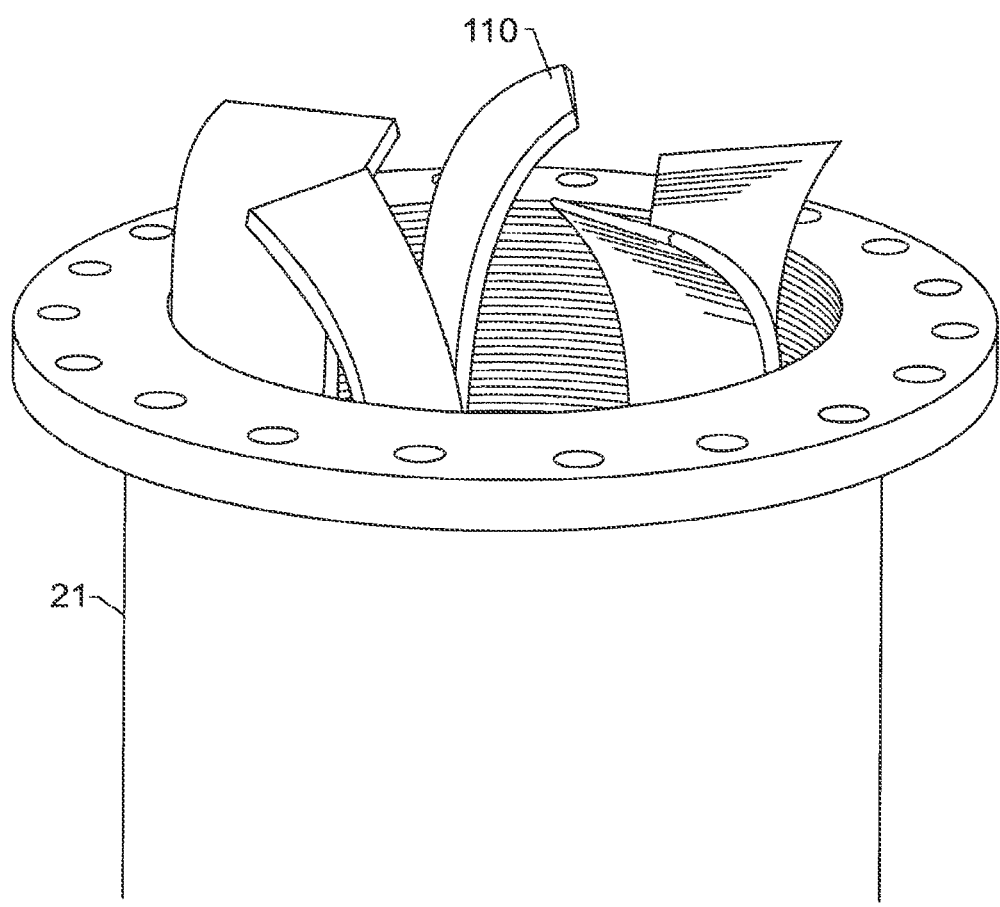
FIG. 6 is a different view of the guide vanes.

FIG. 6 provides a different view of guide vanes 110. In this view, the guide vanes 110 are shown emerging from a pipe 21, which is not connected to the rest of the reactor.

Therefore, the use of guide vanes with pump 100 improves the efficiency of moving the slurry through loop reactor 10 (FIG. 1) by increasing the velocity of the slurry as the slurry departs pump 100 and by reducing the power needed to rotate impeller 22. Thus, the use of guide vanes with impeller 22 produces improved levels of solids.

In a conventional axial pump used in reactors, the impeller blades have a limited range of pitch, or angle to the shaft. Therefore, the slurry discharged from the axial pump blades travels predominantly in the axial direction generally parallel to the shaft of the impeller. However, because of the limited pitch of the blades, the blades interfere with the flow of the slurry, and thus the slurry is slowed down upon contacting the blades. Thus, a significant amount of energy is required to increase the velocity of the slurry with the axial pump.

Figure 7:
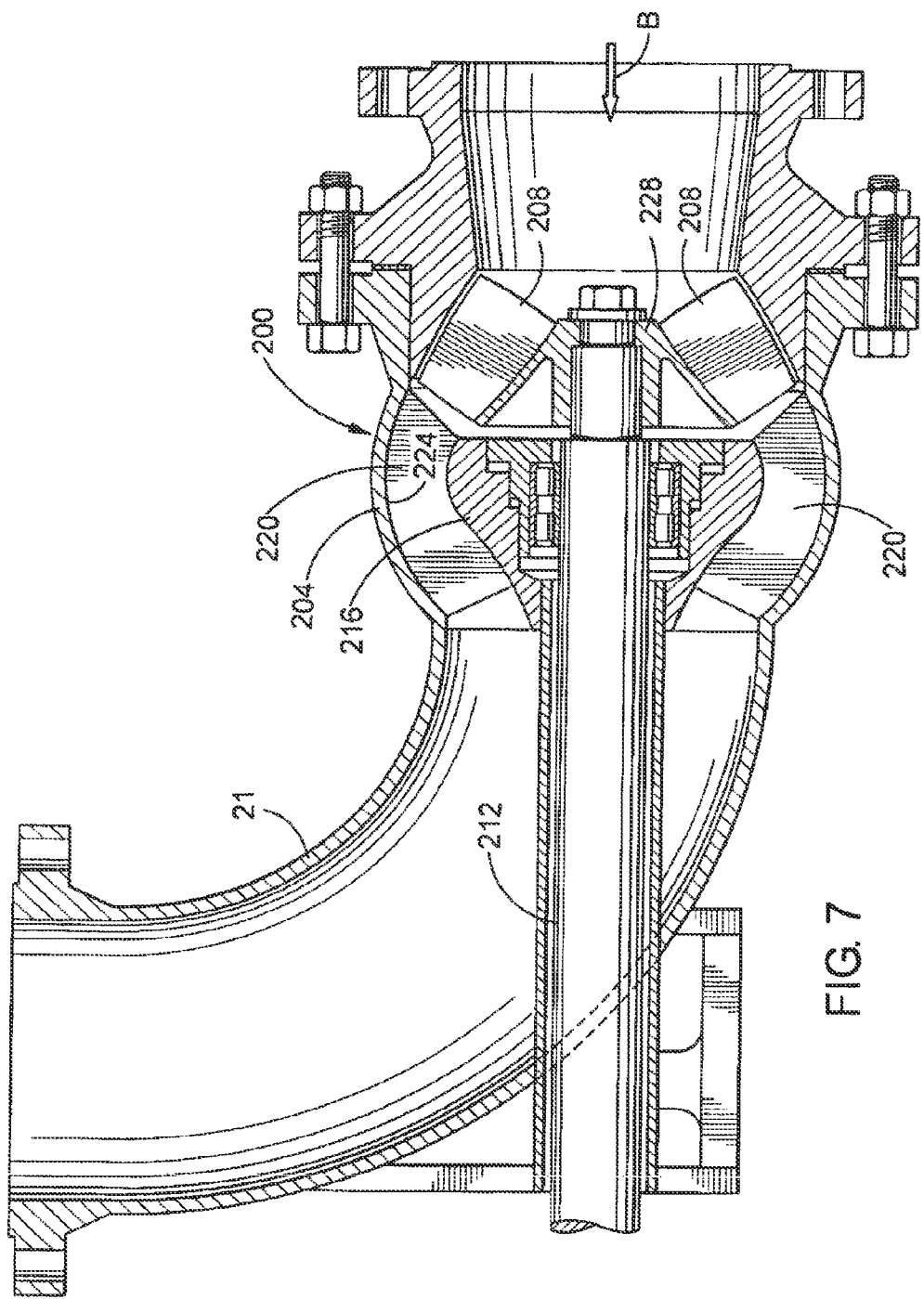
FIG. 7 shows a mixed-flow pump within a pipe.

FIG. 7 shows a mixed pump 200 (i.e., a mixed-flow pump) within a pipe 21. Pump 200 is fitted within pipe 21 in an arced pump case 204 that has a greater diameter than pipe 21. Pump 200 has an impeller 228 joined to a shaft 212 extending through pipe 21. Impeller 228 has blades 208 that are positioned at an angle to shaft 212. Blades 208 may be oriented to the shaft 212 at an angle between 0 and 90 degrees. Pump 200 includes a bulge 216 positioned about shaft 212 within pump case 204 to define a curved or arced flow path 220 between bulge 216 and a wall 224 of pump case 204.

In the mixed pump shown in FIG. 7, slurry flows through pipe 21 to pump 200 in the direction of arrow B and engages blades 208. Because blades 208 may be aligned at different pitches (angles to shaft 212), as impeller 228 rotates, the slurry flows past the blades 208 with less interference, and less energy is needed to increase the velocity of the flow of the slurry. Therefore, mixed pumps can more efficiently increase the velocity of the flowing slurry than axial pumps. The slurry that leaves blades 208 has sizable velocity components in directions both perpendicular and parallel to shaft 212. The flow velocity components of the slurry are captured within flow path 220 and the arced wall 224 of the flow path gradually redirects the direction of the velocity components of the slurry such that the slurry flows in an axial direction parallel to the shaft 212 upon discharge from pump case 204 into pipe 21. Therefore, mixed pumps can generate more head and velocity in the slurry flow than a conventional axial flow pump, and then efficiently redirect the flow of the slurry upon discharge from the impeller 228 such that the improvements in velocity and head are not lost. Thus, mixed pumps efficiently generate the necessary flow head and velocity to address the pressure needs of larger reactors.

It should be noted that a radial pump may be used in the configuration of FIG. 7 as well. A radial pump operates similarly to a mixed pump and provides many of the advantages of the mixed pump, however, a radial pump discharges the slurry flow from the impeller blades more in a direction perpendicular to the shaft 212.

Additionally, post impeller guide vanes may be positioned along flow path 220 to redirect the rotational flow and velocity of the slurry. Slurry discharged from the impeller 228 generally travels in the same rotational direction as the impeller 228 and thus is not directed toward the exit of the flow path 220. The post impeller guide vanes convert and redirect the rotational direction of the velocity, energy, and flow of the slurry such that the slurry that is discharged from the guide vanes travels more in a direction parallel to the shaft 212. Thus, the post impeller guide vanes improve the flow head of the slurry and the pump efficiency. These guide vanes may also be known as diffusers, stators, or struts. They may also provide mechanical support within flow path 200.

The mixed or radial pump may be used in combination with any of the other aspects to be used with reactor loops that are herein disclosed, including: the dual pump arrangement, guide vanes, minimized clearance between the impeller blade and the pipe, manufacturing techniques, and the impeller with a larger diameter than the diameter of the pipe.

Returning to FIG. 2, blades 74 of impeller 22 have tips 88 that extend closely to the inner wall of the enlarged section 66 without actually touching the inner wall. The distance between the tips 88 and the inner wall is the clearance distance. During operation, some of the slurry circulates back over the tips 88 of the blades 74 upstream of impeller 22 after being discharged downstream of impeller 22. Thus, impeller 22 often has to re-engage slurry that it has already engaged once. The reprocessing of the slurry requires more power for impeller 22 and slows down the pumping process. Thus, recirculated slurry leads to a less efficient reactor loop with a reduced slurry velocity.

The smaller the clearance distance, the less likely the slurry is to circulate back over the tips 88 of the blades upstream of impeller 22 after being discharged downstream of impeller 22. The preferred clearance distance in FIG. 2 is $1/64$ of an inch or less. By bringing the tips 88 of the blades 74 within $1/64$ of an inch or less of the inner walls of pipe 21, the impeller 22 reduces recirculation, increasing the velocity and pressure of the slurry at discharge and thus improving the flow and head of the slurry. The improved head, velocity, and flow of the slurry past impeller 22 result in improved levels of solids in the production slurry.

Finally, manufacturing impeller 22 out of aluminum, titanium, or steel produces a stronger impeller that is more durable and that lasts longer. Commercial pumps for utilities such as circulating the reactants in a closed loop reactor are routinely tested by their manufacturers and the necessary pressures to avoid cavitation should be determined. Manufacturing impeller 22 on a 6-axis computer controlled milling machine allows for the fabrication of impeller 22 out of solid masses of metal that can be screened for casting voids that may threaten the structural integrity of impeller 22. Additionally, the 6-axis computer controlled milling machine can be used to closely control the thickness of impeller 22 and ensure that impeller 22 has the necessary overall strength to endure higher velocity, head, and flow requirements and thus improve the efficiency and solids production of reactor loop 10 (FIG. 1).

Increasing the head, velocity, and flow of the slurry by applying the techniques described above results in an improved level of solids being produced. Increasing the velocity of the slurry as it flows through the loop reactor causes a greater heat transfer from the slurry to the cooling jackets. The improved heat transfer results in a more efficient polymerization process and thus a greater yield of solids in the production slurry.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

That which is claimed is:

1. A loop slurry polymerization process comprising:
   introducing a monomer and catalyst to a loop reactor;
   polymerizing the monomer to form a slurry comprising solid polyolefin particles in a liquid medium;
   circulating the slurry using two impellers;
   imparting a first rotational motion to the slurry with a first of the impellers;
   imparting a second rotational motion to the slurry with a second of the impellers, wherein the second rotational motion is opposite to the first rotational motion.

2. The loop slurry polymerization process of claim 1 further comprising pre-swirling the slurry upstream of the first impeller, in a direction opposite to the first rotational motion of the impeller of the first impeller.

3. The loop slurry polymerization process of claim 1 further comprising post-swirling the slurry downstream of the second impeller, in the same direction as the second rotational motion of the second impeller.

4. A loop slurry polymerization process according to claim 1, further comprising minimizing a clearance between at least one impeller and a portion of the loop reactor housing the impeller.

5. A loop slurry polymerization process according to claim 1, wherein the slurry has a concentration of the solid polyolefin particles of at least about 45 weight percent and at most about 75 weight percent.

6. A loop slurry polymerization process according to claim 1, wherein the slurry is circulated at a flow of from about 20,000 gallons/minute to about 50,000 gallons per minute.

7. A loop slurry polymerization process according to claim 1, wherein the impeller achieves a head of from about 120 feet to about 240 feet.

\* \* \* \* \*